United States Patent [19]

Ribi

[11] 4,212,481
[45] Jul. 15, 1980

[54] SUSPENSION SYSTEM FOR VEHICLE WHEELS

[75] Inventor: Valentino Ribi, Genoa, Italy

[73] Assignee: Diafil International S. A., Panama, Panama

[21] Appl. No.: 942,086

[22] Filed: Sep. 13, 1978

[30] Foreign Application Priority Data

Sep. 21, 1977 [IT] Italy .............................. 12769 A/77
Feb. 7, 1978 [IT] Italy .............................. 12463 A/78

[51] Int. Cl.² ............................................. B62K 21/02
[52] U.S. Cl. ................................... 280/276; 280/279; 280/666
[58] Field of Search ............... 280/666, 667, 274, 275, 280/276, 277, 278, 279

[56] References Cited

U.S. PATENT DOCUMENTS

| | | | |
|---|---|---|---|
| 426,402 | 4/1890 | Torkelson | 280/276 |
| 946,143 | 1/1910 | Levedahl | 280/276 |
| 2,463,310 | 3/1949 | Probst | 280/690 |
| 3,630,303 | 12/1971 | Froumajou | 280/666 |

*Primary Examiner*—John J. Love
*Assistant Examiner*—John A. Carroll
*Attorney, Agent, or Firm*—Pollock, Vande Sande & Priddy

[57] ABSTRACT

The invention relates to a suspension system for a vehicle road wheel and to vehicles equipped with the suspension system. In particular, the invention provides a road wheel suspension system comprising two arms mounted for oscillatory motion on respective fulcra on a support structure formed by the vehicle chassis or some part of the vehicle body, the two arms being pivoted at their other ends to spaced positions on a wheel-carrying element so that there is provided an articulated quadrilateral, and according to the invention, the wheel-carrying element has an extension beyond the part of that element which extends between the spaced pivots of the two arms, there being the road wheel mounting on this extension of the wheel-carrying element.

According to preferred features of the invention, the two arms may be disposed on the same side of the wheel-carrying element or on opposite sides of the wheel-carrying element, and the extension on which the wheel is mounted extends in a direction approximately parallel with the ground, when the vehicle is unloaded.

Specific embodiments of the invention include a motorcycle, a motor vehicle having the suspension system applied to both front and rear road wheels, and the undercarriage of an aircraft.

10 Claims, 14 Drawing Figures

SUSPENSION SYSTEM FOR VEHICLE WHEELS

SUMMARY OF THE INVENTION

The present invention relates to a suspension system for a vehicle road wheel and to vehicles equipped with the suspension system. Throughout the specification, reference will be made to the suspension of the road wheel, and to upward movement of the road wheel under applied loads; but it will be understood that in the normal condition of use, the road wheel is in engagement with the ground and the vehicle body is supported on the suspension system. Furthermore, the "upward" movement of the road wheel is a reference to the relative motion which takes place between the road wheel and the vehicle body as permitted by the suspension system, and in some instances, will be brought about by actual downward motion of the body, whilst the road wheel remains stationary.

A known type of road wheel suspension system comprises two arms mounted for oscillatory motion on respective fulcra on a support structure formed by the vehicle chassis or some part of the vehicle body, the two arms being pivoted at their other ends to spaced positions on a wheel-carrying element. There is thus provided an articulated quadrilateral comprising the support structure, the two arms and the wheel-carrying element, and the usual resilient system of the suspension acts on this quadrilateral.

The object of the invention is to provide a suspension system of this known type, in which the permitted oscillation of the road wheel axle traverses a path, which can be predetermined so that it approximates to the ideal oscillatory path for any given type of vehicle usage. It is a further object of the invention to allow the path of oscillation of the road wheel axle to be variable within relatively wide limits.

According to this invention a suspension for a vehicle road wheel comprises a support structure on the vehicle, two arms, each pivoted at one end to the support structure and at the other end to a wheel-carrying element, so that an articulated quadrilateral is formed by the support structure, the two arms and the wheel-carrying element, the arrangement of the quadrilateral being such that the sides formed by the arms converge towards one end, there being resilient means acting on the articulated quadrilateral to oppose relative movement between the support structure and the wheel-carrying element due to a load applied to the vehicle, and a wheel mounting on an extension of the wheel-carrying element beyond the part of that element which extends between the spaced pivots of the two arms on that element.

In one arrangement in accordance with the invention, the support structure fulcra of the two arms are disposed on the same side of the wheel-carrying element. In an alternative arrangement, the support structure fulcra of the two arms are disposed on opposite sides of the wheel-carrying element.

Preferably the extension of the wheel-carrying element on which the wheel mounting is provided extends in a direction approximately parallel with the ground when the vehicle is unloaded. This embodiment of the invention enables a comparatively large oscillation movement, with a relatively small suspension system.

The extension of the wheel-carrying element may project in the direction generally opposite to or the same as that in which the two arms converge. It is however preferred that the extension should be located outside the angle formed by the two arms.

The effective length of one or more of the elements of the articulated quadrilateral may be variable, and this variation may be remotely controlled, for example, from a driving position on the vehicle. In a preferred arrangement, the two arms converge in the direction towards the wheel-carrying element.

The suspension according to the invention can be applied to various types of vehicles, and in particular to automobiles and motor-cycles, but also to bogies, carriages and the like wheeled units, for example to the wheels of undercarriages of aircraft.

In a particular application of the invention an automobile has a front wheel suspended by a suspension system as hereinbefore described, the extension of the wheel-carrying element on which the wheel is mounted projecting forwardly from the articulated quadrilateral, with respect to the front and rear of the vehicle, and the two arms converge in a rearward direction.

In another particular application, an automobile has a suspension system as hereinbefore described, in which the extension of the wheel-carrying element on which the wheel is mounted projects rearwardly from the articulated quadrilateral, with respect to the front and rear of the vehicle, and the two arms converge in a forward direction.

These and other features of the invention will be more easily understood from the following description of various embodiments, which are described here by way of examples only, with reference to the accompanying drawings.

DESCRIPTION OF THE PREFERRED EMBODIMENTS

Figure 1:
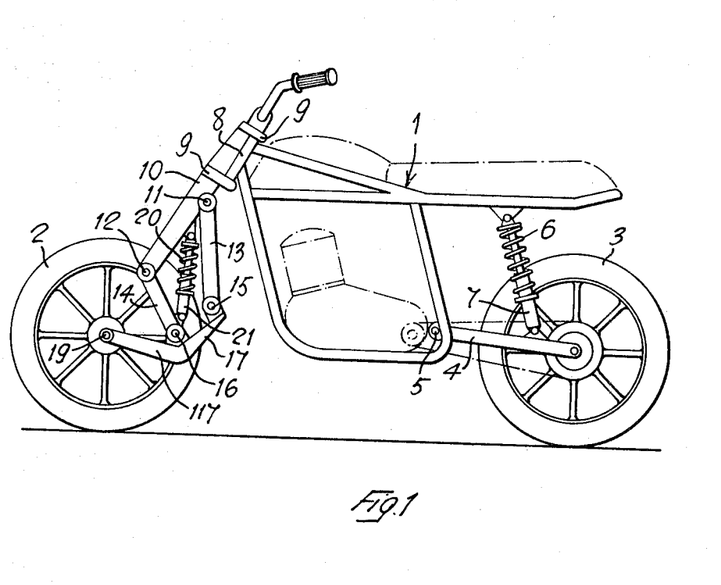
FIG. 1 is a side elevation of a motor-cycle equipped with a suspension system according to the invention, which is applied to the front road wheel.
Figure 2:
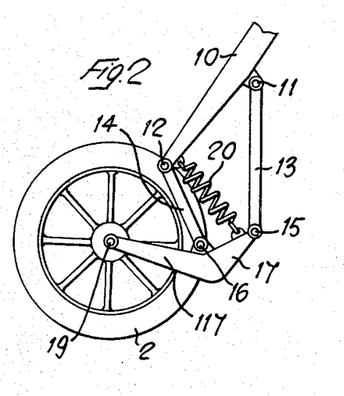
FIGS. 2 to 7 illustrate various possible arrangements of resilient means forming part of the suspension system for the front wheel of a motor-cycle such as that shown in FIG. 1.

In FIG. 1 there is illustrated a motor-cycle comprising a frame 1, a front road wheel 2 and a rear road wheel 3. The rear road wheel 3 is mounted on an oscillating suspension arm 4 pivoted on a fulcrum 5 on the frame 1. A conventional resilient suspension system indicated by a spring 6 and a shock absorber 7 acts on this oscillating arm 4, and this suspension system for the rear road wheel requires no further description.

The steering column of the motor-cycle is shown at 8, and this steering column is mounted in known manner on the frame 1, and is equipped with the usual handlebars. Two forked uprights 10 which carry the front road wheel 2 by means of a suspension system which will be more particularly described, are adjustably mounted on the steering column 8 by means of holding brackets 9.

Figures 8, 9:
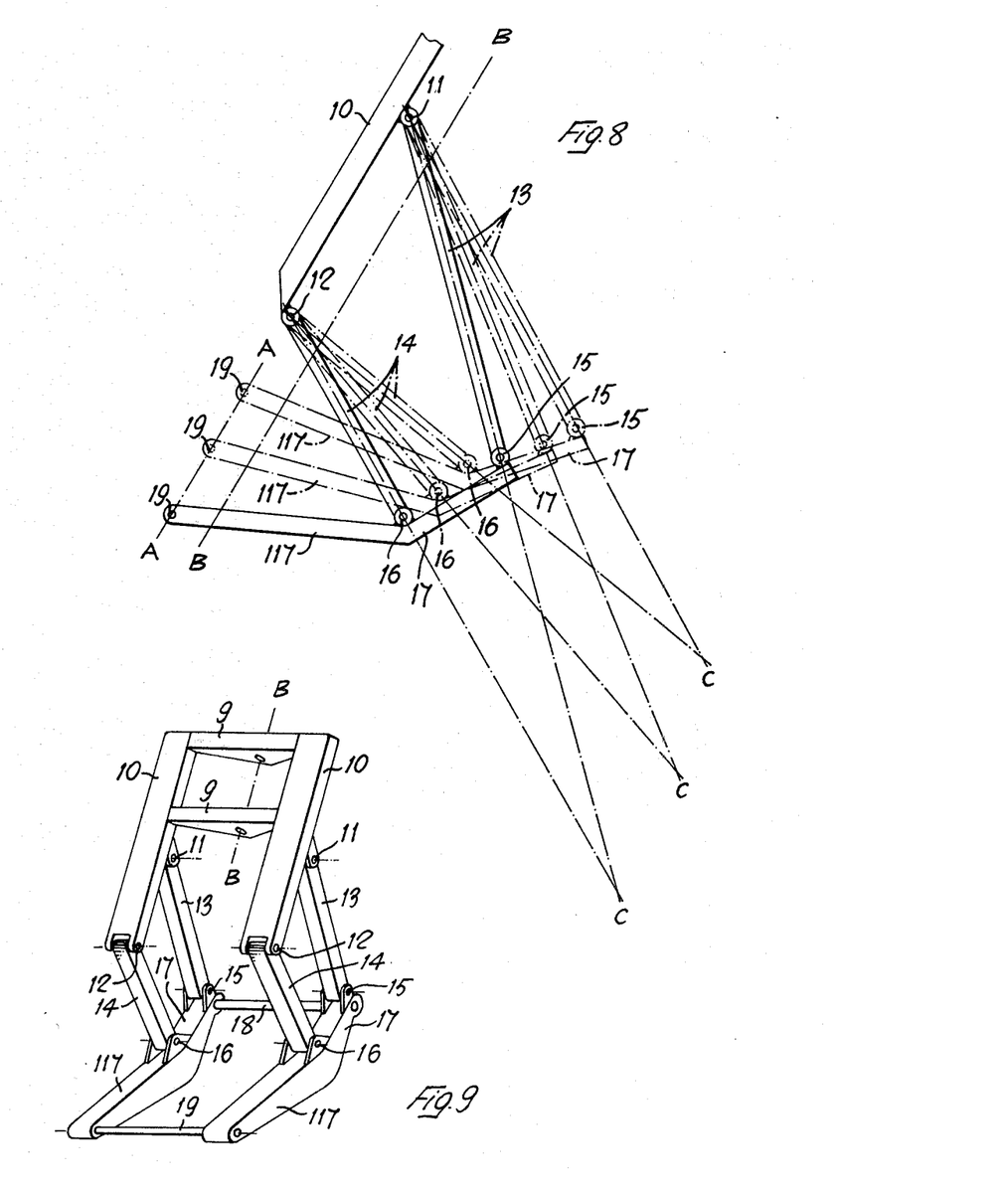
FIG. 8 is a diagram illustrating different positions of the suspension system shown in FIG. 1.
FIG. 9 is a perspective view of the suspension for the front wheel of a motor-cycle according to FIG. 1.

The suspension system includes two oscillating arms 13 and 14 pivoted respectively at 11 and 12 on each of the uprights 10, and a wheel-carrying element 17 attached to each pair of arms 13 and 14. Reference to FIG. 9 will show that the system comprises two identical arrangements one associated with each of the uprights 10. A transverse member 18 and a transverse axle 19 bridge and connect the two wheel-carrying elements 17, so that the two arrangements always move in unison and for descriptive purposes it is only necessary to refer to one of these arrangements. The two arms 13 and 14 are directed somewhat rearwardly and downwardly and not in parallel to one another, that is to say converging towards their lower ends which are pivoted at 15 and 16 respectively to spaced positions on the wheel-carrying element 17. The latter extends forwardly (having regard to the front and rear of the motor-cycle) beyond the point 16 at which the wheel-carrying element 17 is pivotally connected to the oscillating arm 14, as indicated at 117. This prolongation 117 of the wheel-carrying element 17 extends substantially parallel to the ground or in a direction slightly inclined with respect to the ground itself, when the vehicle is not loaded.

The two oscillating arms 13 and 14, the upright 10 to which they are pivoted, and the part of the wheel-carrying element 17 between the pivots 15 and 16 together form an articulated quadrilateral, having hinges at the positions 11, 12, 16, 15. The two articulated quadrilaterals associated with the two uprights 10 are interconnected as previously described, so as to ensure their simultaneous and synchronous movement (see FIG. 9). In particular, prolongations 117 of the two wheel-carrying elements 17 are interconnected near to their forward extremities by means of the axle 19 on which the front road wheel 2 is mounted.

Figure 3:
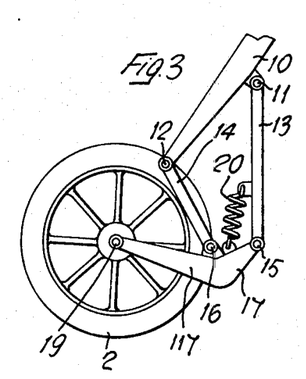
Figure 4:
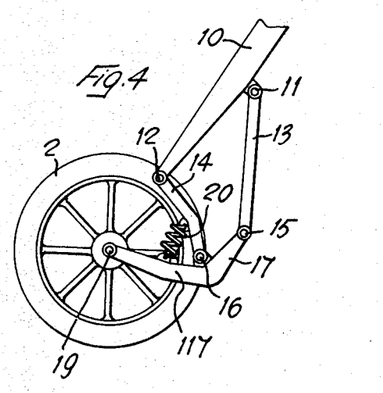
Figure 5:
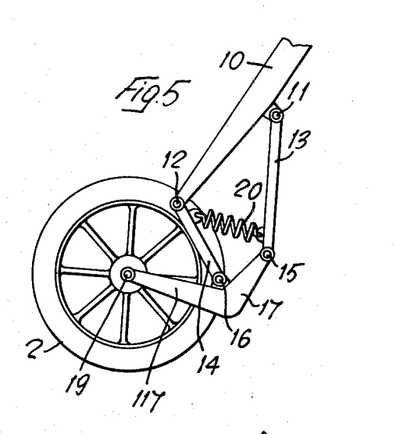
Figure 6:
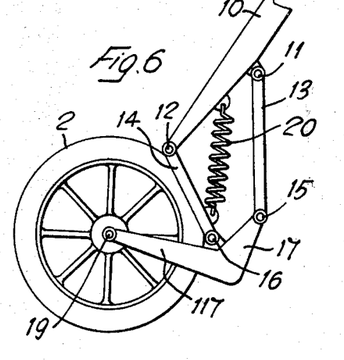
Figure 7:
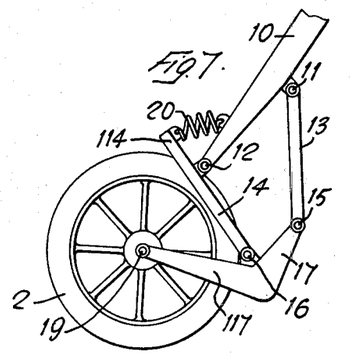

The suspension system of the front road wheel 2 is provided with a resilient system diagrammatically illustrated by a spring 20 and a shock absorber 21 in FIG. 1, and by the spring 20 only in each of FIGS. 2 to 7. This resilient system may be arranged in any convenient way to act between any two of the movable parts 13, 14 and 17 of the articulated quadrilateral, or between any one movable part 13, 14 or 17 of the said quadrilateral and the uprights 10. Thus for instance, in the embodiment according to FIG. 2, the resilient system 20 is interposed between the wheel-carrying element 17 and the upright 10. In FIG. 3, the resilient system 20 acts between the wheel-carrying element 17 and the oscillating arm 13. In the embodiment according to FIG. 4, the resilient system 20 is interposed between the prolongation 117 of the wheel-carrying element 17 and the oscillating arm 14. According to FIG. 5, the resilient system 20 acts between the two oscillating arms 13 and 14 of the articulated quadrilateral. The embodiment according to FIG. 6 is the same as that shown in FIG. 1, and in this system, the resilient system 20 is interposed between the oscillating arm 14 and the upright 10. Finally, in the embodiment according to FIG. 7, the resilient system acts between the upright 10 and a prolongation 114 of the oscillating arm 14 extending beyond the fulcrum 12.

FIG. 8 illustrates three different instantaneous positions of the suspension system for the motor-cycle front road wheel as shown in FIGS. 1, 6 and 9. As the road wheel moves upwardly relatively to the frame 1, of the motor-cycle, the axle 19 is raised, but this produces a compound movement of the wheel-carrying member 17, which is constrained by the two converging arms 13 and 14, each of which can only turn about its respective pivot 11 and 12. As a result, the wheel-carrying element 17 moves in a trajectory indicated by the three instantaneous positions shown one in full lines and the other two in chain-dotted lines. The element 17 not only moves, it also tilts, and the resultant path of the axle is on a "curve" A—A which is substantially rectilinear and parallel to the axis B—B of the steering column 8, and does not substantially change its distance from the steering column 8 along the path of oscillation of the suspension system. In FIG. 8, the instantaneous centres about which the element 17 can be considered to be turning (i.e. the points of intersection of the axes of the two oscillating arms 13 and 14) for the three different illustrated positions of the articulated quadrilateral are indicated by the letter C. It is clear that the instantaneous centre C is always located on the side of the articulated quadrilateral between the pivots 11, 12, 16, 15 opposite to the upright 10, that is to say on the side of the wheel-carrying element 17.

Figure 10:
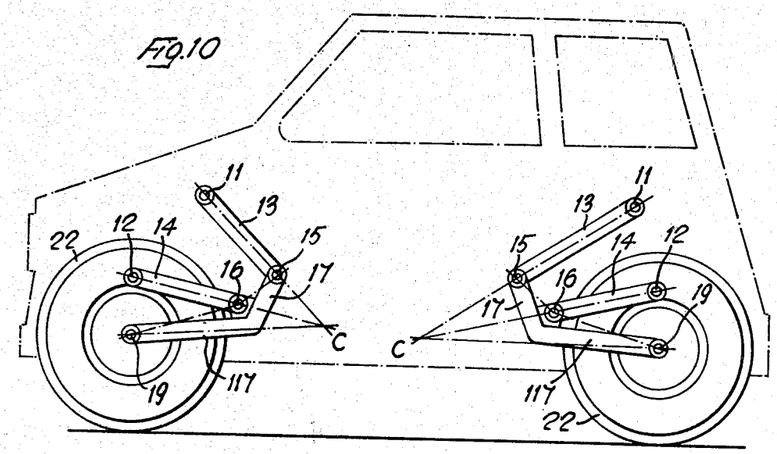
FIG. 10 is a diagrammatic side elevation of an automobile with suspensions in accordance with the invention applied to the front and rear road wheels.
Figures 11, 14:
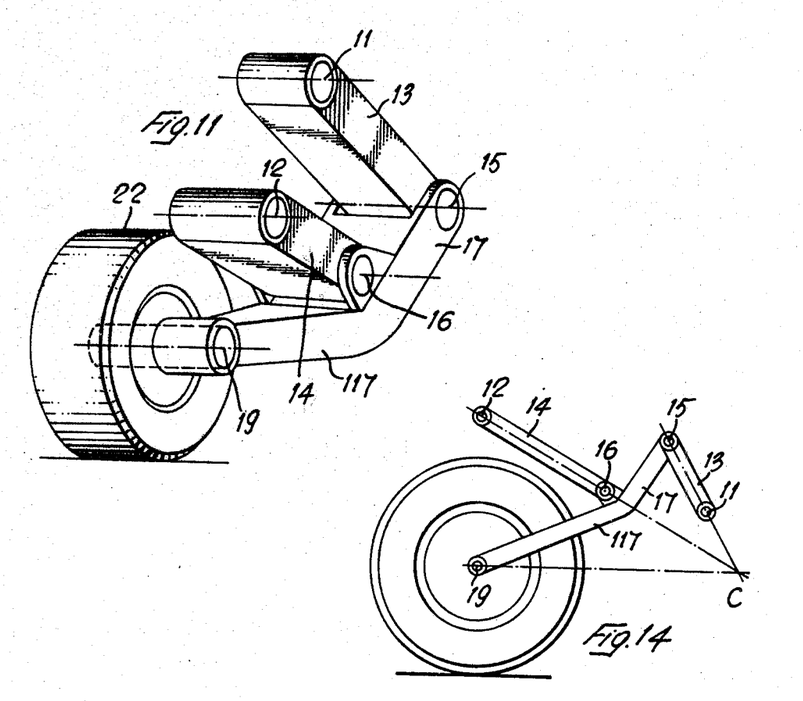
FIG. 11 is a perspective view of one of the suspension systems shown in FIG. 10.
FIG. 14 illustrates an alternative embodiment of a suspension system according to the invention.

FIGS. 10 and 11 illustrate the suspension system according to the invention applied to the road wheels 22 of an automobile. Two suspension systems are shown, one for each road wheel and each of these systems also comprises two oscillating arms 13 and 14 which are not parallel to one another, that is to say which converge, and have fulcra at the points 11 and 12 on the automobile frame or chassis or on any other structure or part of the automobile. The wheel-carrying element 17 pivotally connected at 15 and 16 to the free ends of the oscillating arms 13 and 14 has a prolongation 117 extending beyond the point 16 of pivotal connection to the oscillating arm 14. This prolongation 117 of the wheel-carrying element 17 is substantially parallel to the ground or slightly inclined with respect to the ground itself when the vehicle is unloaded, and carries the axle 19 on which the road wheel 22 of the automobile is mounted.

The suspension is of course completed by resilient means and shock absorbers which have not been illustrated, and which may be arranged between the automobile frame and any one of the oscillating arms 13 and 14 or between the automobile frame and the wheel-carrying element 17, 117, or between the two oscillating arms 13 and 14 or between one of these arms and the wheel-carrying element 17, 117, in similar fashion to what is illustrated in FIGS. 2 to 7. The instantaneous centre, that is to say the point of intersection of the axes of the two oscillating arms, is indicated by the letter C.

FIG. 10 shows that both the front and rear road wheels of the automobile are provided with the suspension system. This however is not always necessary, in as much as the suspension system may be applied only to the front wheels or only to the rear wheels.

Moreover, from FIG. 10, it is clear that in the case of the front wheels, the two oscillating arms 13 and 14 are directed rearwardly and inclined downwardly, and the prolongation 117 of the wheel-carrying element 17, on which the front road wheel 22 itself is mounted, is directed forwardly, with reference to the normal direction of travel of the automobile. The point of intersection of the two oscillating arms 13 and 14 which constitute the instantaneous centre C, is located behind the front road wheel 22, that is to say the two oscillating arms 13 and 14 converge rearwardly.

In the case of the rear road wheels, on the other hand, the two oscillating arms 13 and 14 are directed forwardly with reference to the normal direction of travel of the vehicle and are inclined downwardly, whilst the prolongation 117 of the wheel-carrying element 17 is directed rearwardly. The point of intersection of the axes of the two oscillating arms 13 and 14, which constitutes the instantaneous centre C, is located in front of the rear road wheel, that is to say the two oscillating arms 13 and 14 converge forwardly.

In this particular embodiment, during breaking, of the vehicle, an anti-compression (anti-squat) effect is obtained on the front part of the vehicle and an anti-lift effect is obtained on the rear part of the vehicle, provided of course, that the brake is anchored in each case on the wheel-carrying element 17. The suspension system may of course, be constructed in such a manner as to produce neutral behavior during braking of the vehicle, that is to say neither an anti-squat or an anti-lift effect. It is also possible to make the suspension of the front road wheels neutral and that of the rear road wheels anti-lift, or to make the suspension of the front road wheels anti-squat and that of the rear road wheels neutral.

The application of the suspension system previously described to the road wheels of a motor-cycle and of automobiles, in general offers, inter alia the following advantages:

(a) The path of oscillation of the axle of the road wheel may be present as required on curves which approximate substantially to the required ideal path constituted for instance by a straight line.

(b) If required, it is possible to reduce or even eliminate the variation of the distance between the axles of the wheels of the vehicle, which occurs when one road wheel is elevated.

(c) If required, it is possible to reduce or eliminate the variation of the track of the vehicle.

(d) It is possible to obtain a greater permitted oscillatory movement of the road wheel with a given weight and/or robustness and/or dimensions of the suspension system.

(e) The roughnesses of the ground are absorbed in a softer manner than with the known articulated quadrilateral type suspension system.

(f) Reduction of the oscillating masses.

(g) The possible compensation for braking (anti-squat and/or anti-lift).

(h) The possibility of constructing the frame with reduced need for precision.

(i) Great robustness, equal to that of known suspensions with a single oscillating arm.

(j) Lower weight of the suspension system for a given robustness and length of path of oscillation.

(k) Less maintenance is required.

(l) Lower cost of production.

(m) Easy replacement of the resilient system (i.e. the spring 20 and shock absorber 21).

(n) The self-returning moment of the road wheel remains constant along the path of oscillation of the suspension system.

(o) The possibility of obtaining an axle displacement curve designed so that it is adapted to the needs of a particular use.

(p) The possibility of changing the anti-squat or anti-lift effect of the suspension system during braking, according to the needs of a particular use.

The suspension system described with reference to FIGS. 1, 6 and 9 is particularly suitable for cross-country vehicles. It can however be applied to any kind of vehicle, for instance to bicycles, three-wheeled vehicles and others.

Figure 12:
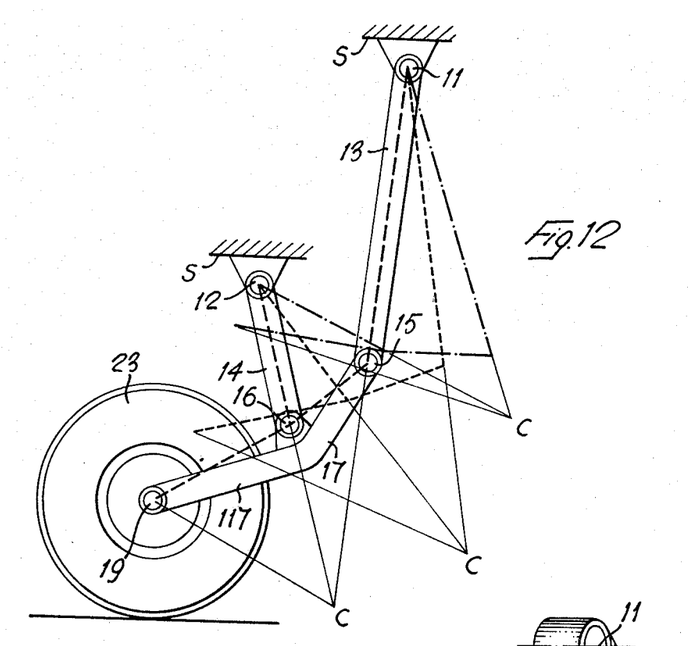
FIG. 12 shows in side elevation the application of a suspension system according to the invention to the wheels of the undercarriage of an aircraft.
Figure 13:
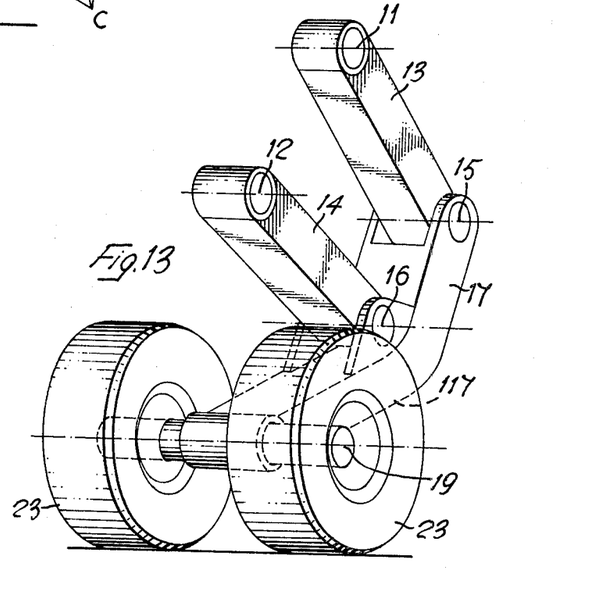
FIG. 13 is a perspective view of the suspension system of the aircraft wheel according to FIG. 12.

FIGS. 12 and 13 illustrate an embodiment in which a suspension according to the invention is applied to the ground wheels of the undercarriage of an aircraft. In this case also, two oscillating arms 13 and 14 are provided, which are inclined with respect to each other, and have fulcra at 11 and 12, on the structure S of the undercarriage of an aircraft. The wheel-carrying element 17 pivoted at 15 and 16 to the free ends of these oscillating arms 13 and 14 is prolonged beyond one of the pivots 15 and 16. The axle 19 which carries a pair of co-axial ground wheels 23 (see FIG. 13) is mounted on this prolongation 117. The point of intersection of the axes of the two oscillating arms 13 and 14 constitutes the instantaneous centre C. The prolongation 117 of the wheel-carrying element 17 may be directed forwardly or rearwardly with reference to the direction of travel of the aircraft. Two other positions of the suspension and of the instantaneous centre are also illustrated in FIG. 12, one being shown in dotted lines and the other in chaindotted lines.

It will be appreciated, that the path of the instantaneous centre C may be arranged to follow curves different from the straight line path, which is substantially obtained in the embodiment illustrated in the drawings. Moreover, the path of the instantaneous centre C may be changed as required, even under the control of the pilot of the aircraft, with the aid of any convenient device adapted to displace the fulcrum of one or both of the arms 13 and 14 on the structure S or on the wheel-carrying element 17. Such a displacement of one or more of the fulcra can be controlled remotely, and with this arrangement, it is possible to change the geometry of the articulated quadrilateral. Alternatively, and again possibly under remote control, an arrangement may be provided for changing the effective length of one or both of the arms 13 and 14, and again this provides a means whereby the geometry of the articulated quadrilateral can be adjusted. Where there is provision for altering the geometry of the quadrilateral, the suspension system can be adapted to particular operational requirements, for example the condition of the runways, the load applied to the aircraft, or to skidding or other functions.

In addition to the advantages previously listed in the case of automobiles, the application of the suspension system according to the invention to the wheels of an aircraft undercarriage also presents the following advantages:

(q) Great torsional rigidity.

(r) Ease of retraction of the undercarriage, there being a variety of possibilities for the retraction of the undercarriage itself.

(s) Reduced weight of the undercarriage as a whole.

(t) Less need for maintenance.

(u) East replacement of each part of the suspension system, and in particular of the spring and shock absorber system.

(v) The possibility of using the wheel-carrying element 17 and its prolongation 117 as an emergency runner, as in the case of failure of the wheel itself.

(w) The fact that the suspension will function satisfactorily, even if the arms making up the articulated quadrilateral are subjected to bending.

FIG. 14 illustrates an alternative embodiment, in which the fulcra 11 and 12 of the two oscillating arms 13 and 14 on the structure of the vehicle, which may be an automobile frame, or an undercarriage of an aircraft or the like, are not located on the same side of the wheel-carrying element 17, 117 as in the cases illustrated in FIGS. 1 to 13, but are provided on opposite sides of the wheel-carrying element itself. Thus, the fulcrum 12 is located forwardly and above the wheel-carrying element 17, whilst the fulcrum 11 is located below and to the rear of the wheel-carrying element. There is no change in the essential characteristic, that the two oscillating arms 13 and 14 are inclined to one another, so that their longitudinal axes intersect at the point C, which constitutes the instantaneous centre for movement of the wheel-carrying element 17. Furthermore, as in the previously described examples, the road wheel is mounted on the prolongation 117 of the wheel-carrying element 17 beyond the point at which this element is pivoted to one of the oscillating arms 13 and 14. This embodiment according to FIG. 14, is particularly suitable for obtaining specific paths of oscillation of the wheels mounted on this type of suspension system, particularly in cases in which it is desirable to make the overall height of the suspension system small. The embodiment according to FIG. 14 can of course be applied to all types of vehicles.

According to another characteristic of the invention, the suspension system may be constructed in such a manner that the reaction torque of the brake applied to the wheel-carrying element 17, 117 wholly or partially compensates for the increase or decrease in the load on the wheel itself during braking, so that the oscillation movement of the wheel is wholly available for absorbing the roughness of the ground. In this case, which is also particularly applicable to the suspension of the front road wheel of a motorcycle or a bicycle, it is possible to obtain a neutral behaviour of the front part, in particular of the front part of the motor cycle or bicycle. In the case of a motor-cycle however, it is possible to replace the spring acting on the system, according to the driving position of the rider (forwardly or rearwardly on the saddle) without affecting the safety of the braking action. As a consequence, the advantage is also obtained, that the longitudinal trim of the vehicle or of the aircraft does not vary.

In all cases, and in particular in the case of cross-country vehicles (motor cycles or automobiles) the various joints of the suspension system may be protected against the ingress of mud or water, or against impacts and blows, in any convenient manner, for example by means of caps or other protectors.

Because of the geometry of the suspension system, any play which occurs in the pivots, compensates for that in other pivots, so that the summation of the play tends towards zero, and the play which is found in the pivots is not cumulative, as might appear at first sight. In the case of steering wheels, the steering column may be pivoted either between the frame and the supports of the pivots 11 and 12, or directly between the hub of the wheel and the wheel-carrying element 17, 117.

Also, the prolongation 117 of the wheel-carrying element 17 on which the wheel itself is mounted, may extend from the articulated quadrilateral in the direction opposite to that in which the oscillating arms 13 and 14 converge, as illustrated in the Figures, or alternatively, it may extend towards the same side towards which the oscillating arms 13 and 14 converge.

It is also to be noted, that the prolongation 117 of the wheel-carrying element 17 extends outside the angle formed by the two oscillating arms 13 and 14 as they converge towards one another.

Generally, the bisector of the angle formed between the prolongation 117 of the wheel-carrying element 17 and the oscillating arm 14, beyond the point 16 of pivotal connection from which the said prolongation 117 extends, is preferably substantially perpendicular to the path of excursion, for example A—A, (FIG. 8), of the axle of the wheel.

I claim:

1. A suspension system for a vehicle road wheel comprising
   (a) two swinging arms each pivoted at one end to a suspended structure and extending at an angle to one another in a longitudinal plane of the vehicle, each of said two arms being pivoted at its other end to a wheel-carrying element, whereby an articulated quadrilateral is formed by said suspended structure, said two arms and said wheel-carrying element;
   (b) resilient means acting on the said articulated quadrilateral;
   (c) a prolongation of said wheel-carrying element extending outside the area of the angle formed by said two swinging arms and beyond the point of pivotal connection to one of the said swinging arms which point is nearer to the ground, said prolongation extending towards the plane passing through the points of pivotal connection of said two swinging arms to said suspended structure;
   (d) said wheel being mounted on a wheel mounting provided on said prolongation of said wheel-carrying element;
   (e) the axis of said wheel being located in the space defined by the plane passing through the two points of pivotal connection of the swinging arm which is closer to the ground and the plane passing through the points of pivotal connection of said two swinging arms to said wheel-carrying element.

2. A suspension system for a vehicle road wheel as claimed in claim 1, wherein said axis of said wheel is located adjacent the plane passing through the points of pivotal connection of said two swinging arms to said suspended structure.

3. A suspension system for a vehicle road wheel according to claim 1 or 2, wherein the bisector of the angle formed between said prolongation of said wheel-carrying element and the swinging arm which is nearer to the ground is substantially perpendicular to the plane passing through the points of pivotal connection of said two swinging arms to said suspended structure.

4. A suspension system for a vehicle road wheel according to claim 1, wherein said two swinging arms converge in the direction towards the wheel-carrying element articulated thereto.

5. A suspension system for a vehicle road wheel according to claim 4, wherein, in the case of a front wheel of said vehicle, and with reference to the direction of movement of said vehicle, said two swinging arms extend in a rearward direction with respect to said suspended structure while said prolongation of said wheel-carrying element projects forwardly.

6. A suspension system for a vehicle road wheel according to claim 5, wherein said two swinging arms converge in a rearward direction.

7. A suspension system for a vehicle road wheel according to claim 4, wherein, in the case of a rear wheel of said vehicle, and with reference to the direction of movement of said vehicle, said two swinging arms extend in a forward direction with respect to said suspended structure, while said prolongation of said wheel-carrying element projects rearwardly.

8. A suspension system for a vehicle road wheel according to claim 7, wherein said two swinging arms converge in a forward direction.

9. A suspension system according to claim 1, wherein said prolongation of said wheel-carrying element on which said wheel is mounted extends in a direction substantially parallel to the ground.

10. A suspension system according to claim 1, comprising means for permitting the variation of the pivotal points of at least one of said two swinging arms and of the length thereof.

* * * * *